United States Patent [19]
Courty

[11] 3,731,532
[45] May 8, 1973

[54] ULTRASONIC FLOWMETER AND METHOD OF METERING

[75] Inventor: Albert Courty, Paris, France

[73] Assignee: Thomson-CSF, Paris, France

[22] Filed: Jan. 14, 1972

[21] Appl. No.: 217,753

[52] U.S. Cl. ............................................. 73/194 A
[51] Int. Cl. ........................... G01p 5/00, G01f 1/00
[58] Field of Search ............................. 73/194 A

[56] References Cited
UNITED STATES PATENTS

| | | | |
|---|---|---|---|
| 3,336,801 | 8/1967 | Snavely | 73/194 A X |
| 3,402,606 | 9/1968 | Bruha | 73/194 A |
| 3,537,309 | 11/1970 | Geohegan, Jr. et al. | 73/194 A |
| 3,631,719 | 1/1971 | Charvier | 73/194 A |

*Primary Examiner*—Charles A. Ruehl
*Attorney*—Edwin E. Greigg

[57] ABSTRACT

In an ultrasonic flowmeter first ultrasonic signals are caused to traverse in both directions the fluid carrying conduit at an angle with respect to the direction of fluid flow. The times $t_1$ and $t_2$ necessary for the signals to traverse in the one and in the other direction are measured. By means of a second ultrasonic signals traversing said conduit normal to the direction of fluid flow in a time $t_0$ to a train of signal pulses with a periodicity of $t_0$ is generated for obtaining with the aid of three counters, $(t_2 - t_1(/t_0^2$ which is a measure of the flow rate and from which the uncertain term representing the speed of the ultrasonic signal in the fluid is eliminated.

3 Claims, 5 Drawing Figures

ULTRASONIC FLOWMETER AND METHOD OF METERING

BACKGROUND OF THE INVENTION

This invention relates to an apparatus for measuring the flow of a fluid, such as a liquid, in a conduit.

Flowmeters are known which utilize the measured time period necessary for an ultrasonic wave to travel from one wall portion of the conduit to another.

The aforenoted duration is a function of the speed of displacement of the fluid and the traveling speed of sound in the fluid. It is a disadvantage of flowmeters of this type that the last-named speed is not always known with high precision.

Furthermore, if the liquid is non-homogeneous as it may be the case in oil conduits where different types of oil derivatives may flow in the conduit in succession, the traveling speed of sound may vary between relatively wide limits.

French Patent No. 1,375,940 discloses a flowmeter which, by means of two successive measurements and with the aid of a numeric calculator, permits an elimination of the influence of the traveling speed of sound in the fluid.

The disadvantage of the aforenamed flowmeter resides in the fact that it requires the use of a numeric calculator, which substantially increases the costs involved.

OBJECT AND SUMMARY OF THE INVENTION

It is an object of the invention to provide an improved ultrasonic flowmeter in which the aforenoted disadvantages are eliminated.

Briefly stated, according to the invention, there is provided an improved ultrasonic flowmeter in which the numeric calculator is replaced by three forward and reverse counters.

The invention will be better understood, as well as further objects and advantages will become more apparent, from the ensuing detailed specification of a preferred, although exemplary, embodiment taken in conjunction with the drawing.

SUMMARIZED DESCRIPTION OF THE MEASURING SYSTEM AND ITS COMPONENTS

Figure 1:
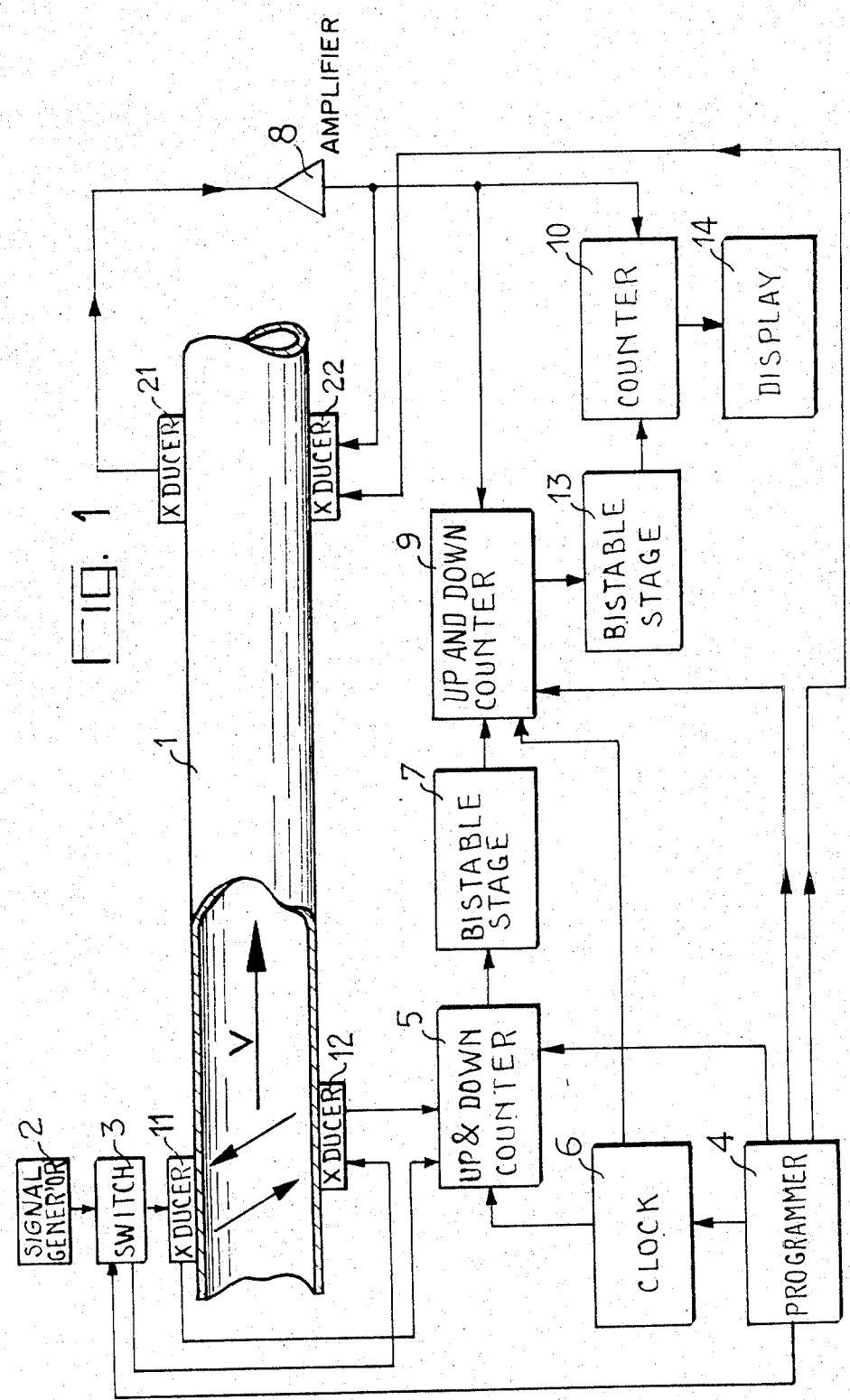
FIG. 1 is a block diagram of the flowmeter components of the preferred embodiment.

Turning now to FIG. 1, there is shown a fluid carrying conduit 1 in which the fluid flows with a speed V in the direction of the axial arrow.

Two first electroacoustic transducers 11 and 12 are disposed on two generatrices of the conduit 1 belonging to the same diametral plane. The transducer 11 is disposed upstream of the transducer 12. Each transducer 11, 12 is adapted to emit an ultrasonic beam and to receive the ultrasonic beam emitted by the other. This is indicated by the two parallel, oppositely oriented arrows drawn into the conduit 1. The transducers 11 and 12 transmit in response to an electric signal generated by the generator 2. The output signal of the latter is applied alternately to the transducer 11 and the transducer 12 by means of a switch 3 actuated by a programmer 4. The electric outputs of the two transducers 11 and 12 are connected to the inputs of a forward and reverse counter 5 for controlling the operation of the latter. The counter 5 counts the pulses of a clock pulse generator 6 activated by the programmer 4. The latter also sets the counter 5 into a state for reverse counting. The pulses which the counter 5 emits during its reverse counting maintain a bistable stage 7 open until the counter reaches zero.

Two additional transducers 21 (receiver) and 22 (emitter) are placed at diametrically opposite locations of the conduit 1, for example, downstream of the transducers 11 and 12. The output of the transducer 21 is connected to the input of the transducer 22 through an amplifier 8. Thus, when the transducer 22 emits an ultrasonic pulse, the latter is received by the transducer 21 which, in response, emits an electric pulse applied to the input of the transducer 22 through the amplifier 8. In this manner a series of pulses are generated, the periodicity of which will be equal to the duration $t_0$ required for the ultrasonic wave to travel from the transducer 22 to the transducer 21. The transducer 22 is activated by the programmer 4.

The pulses received by the transducer 21 are counted successively by two counters 9 and 10. The counter 9 is activated by the bistable stage 7, while the counter 10 is activated by an additional bistable stage 13. The latter, in turn, is controlled by the counter 9 in the same manner as the bistable stage 7 is controlled by the counter 5. The counter 9 is also controlled by the programmer 4. The output of the counter 10 is connected to a display device 14 which indicates the measured fluid speed resulting from the multistep measuring operation first to be described in a summarized manner.

OPERATION OF THE SYSTEM SHOWN IN FIG. 1

The signal generator 2 which, in a first measuring period is connected to the transducer 11 by the switch 3, emits a train of waves having a frequency chosen in such a manner that the difference in phase due to the traveling time of the wave from the transducer 11 to transducer 12 or conversely, is less than $2\pi$.

Figure 2:
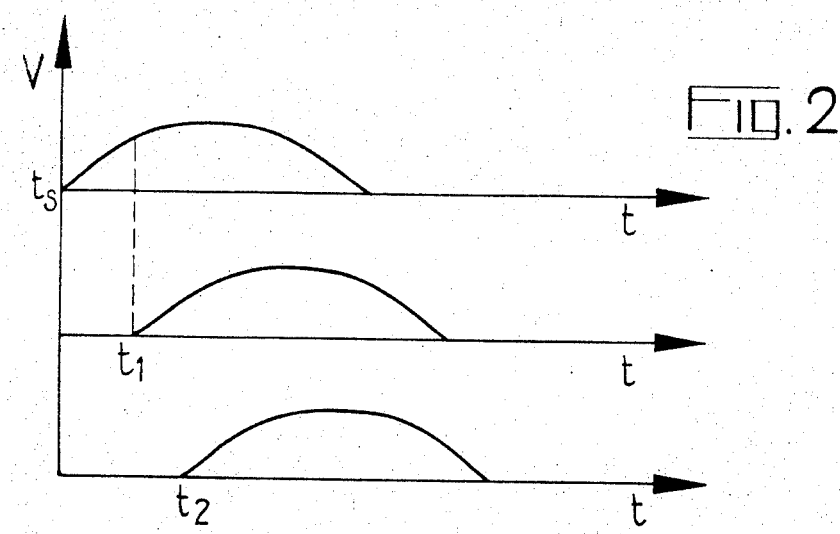
FIG. 2 is an explanatory diagram illustrating signal pulses staggered in time.

Subsequent to the termination of the transitory period and from the beginning of a moment determined by the programmer 4, the first passage through zero of the emitted electric signal with a positive slope is marked at an instant $t_0$ (FIG. 2).

The counter 5 and the clock 6 are activated at the moment $t_0$. The counter 5 counts the clock pulses of the clock 6 until, at the moment $t_1$, it is stopped by the transducer 12. This moment $t_1$ is the first instant succeeding $t_0$ when the electric signal generated by the transducer 12 in response to the ultrasonic signal emitted by the transducer 11 traverses the zero level with a positive slope. Thus, time $t_1$ is the period necessary for the ultrasonic signal to travel from transducer 11 to transducer 12.

At that moment the measuring process is stopped. The counter 5 has counted $N_1$ clock pulses.

In a second measuring period the switch 3 connects the transducer 12 with the generator 2. The measurement is effected in the same manner as precedingly described, except that now the counter 5 is set into a position for reverse counting until it reaches zero (erasure of its contents), whereupon it is set into a forward counting position. The counter 5 then counts forward until the moment $t_2$ at which time the electric signal transmitted by the transducer 11, in response to the receipt of the ultrasonic signal emitted by the transducer 12, passes through the zero level with a positive slope and arrests the counter 5. The latter then has a count of $N_2$ which is equal to $t_2 - t_1$ with an accuracy within one clock pulse period.

Thus, $$t_1 = L/(c + v \cos\theta),$$

$$t_2 = L/(c - v \cos\theta)$$

where $L$ is the distance from the transducer 11 to the transducer 12, $c$ is the speed of the ultrasonic signal in the fluid, $v$ is the speed of the fluid and $\cos\theta$ is the angle between the two directions $\overrightarrow{11\text{-}12}$ and $\overrightarrow{V}$.

The expression $t_2 - t_1$ is, since $v^2$ is negligible with respect to $c^2$, approximately equal to $$t_2 - t_1 \simeq (2 L v \cos\theta)/c^2$$

Knowing $N_2$, $v$ can be determined if $L$ and $c$ are known. Thus, as it has been mentioned before, $c$ is not always constant and furthermore its value is not always known with precision. In order to eliminate this term, the flow metering process includes two further measuring periods.

In the third measuring period the counter 5 is placed into the reverse counting position by the programmer 4. The clock pulses now counted by the counter 5 may have a frequency which is much smaller than during the first two counting periods. In fact, in the first two counting periods, the clock pulse frequency had to be large with respect to that of the ultrasonic wave in order to obtain a good resolution. As it will be seen, the inverse of the above is now of interest.

In the third measuring period the transducer 22 is caused to operate. It transmits an ultrasonic signal which is received at the end of time $t_0$ by the transducer 21. The latter, in response, transmits an electric pulse amplified by the amplifier 8 and applied to the input of the transducer 22. A coupling is thus constituted and a series of pulses is emitted with the periodicity of $t_0$.

In order to eliminate the factor $c$, it is sufficient to measure $t_0$ and then form the quotient $$(t_2 - t_1)/t_0^2$$

in which there appear only $v$ and constant terms.

It may be demonstrated that $t_0^2$ is equal to $D^2/c^2$ wherein $D$ is the diameter of the fluid conduit 1.

The aforedescribed operation is effected by means of counters 9 and 10.

The counter 9 counts the pulses of $t_0$ periodicity as long as it is maintained active by the bistable stage 7, that is, as long as the counter 5 is not empty. Upon such occurrence, the counter 9 is stopped.

The number $N_3$ contained in the counter 9 is then proportionate to $(t_2 - t_1)/t_0$. In fact, the period necessary for the counter 5 to empty is proportionate to $t_2 - t_1$ and the number which is indicated by the counter 9 is inversely proportional to $t_0$, that is, proportionate to $f_0 = 1/t_0$, the frequency of the recycling pulses.

The same operation, in a fourth measuring period, is effected by means of the counter 10, while the counter 9 is placed in the position of reverse counting by the action of the same clock pulse generator.

In this manner the sought result is obtained: the counter 10 indicates a number $N_4$ proportionate to $(t_2 - t_1)/t_0^2$. A signal representing the number $N_4$ is applied by the counter 10 to the display device 14.

DESCRIPTION OF THE CIRCUIT USED IN THE FIRST TWO MEASURING PERIODS

Figure 3:
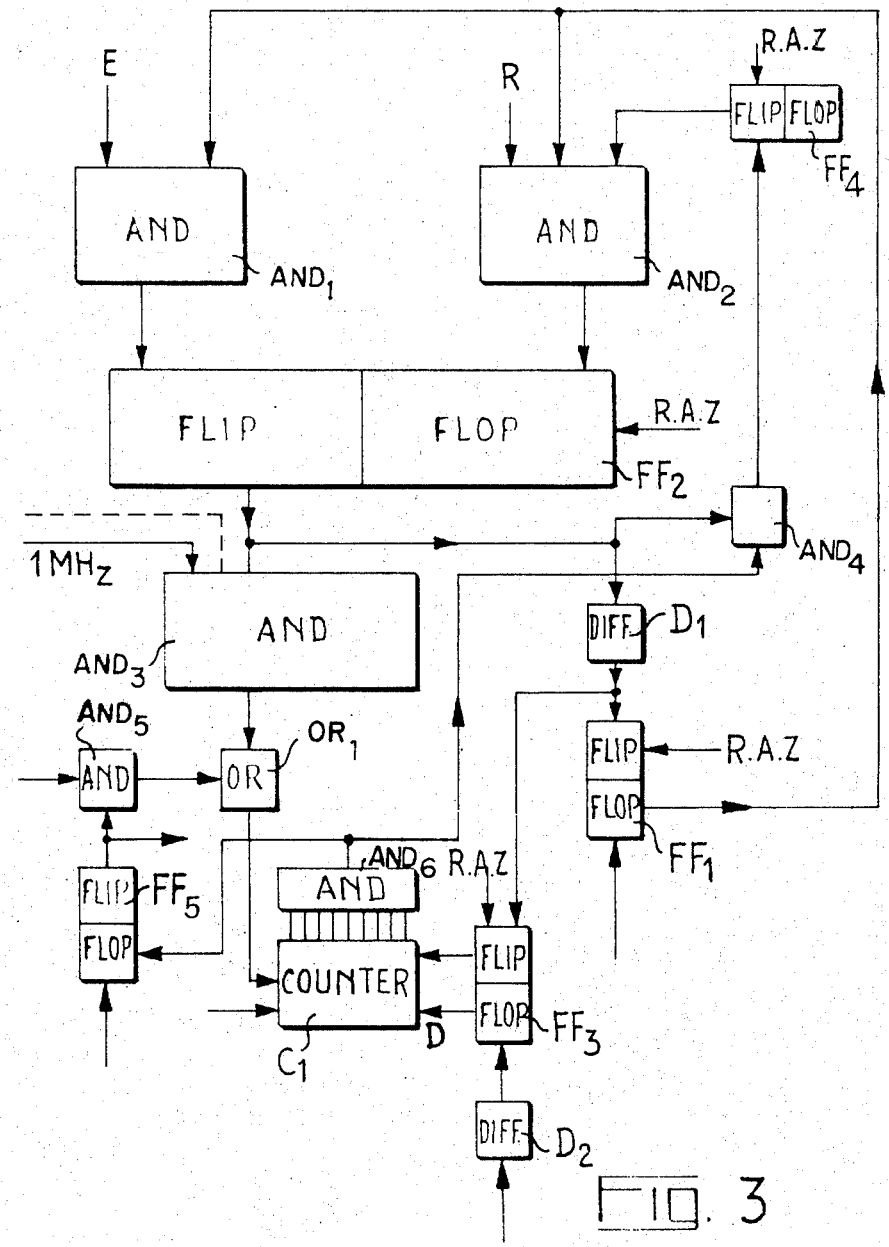
FIG. 3 is a diagram of a first circuit assembly of the preferred embodiment.

FIG. 3 shows a diagram of an exemplary circuit for effecting measurements in the first two measuring periods.

The circuit shown in FIG. 3 comprises a first flip-flop circuit $FF_1$ which receives from the programmer (not shown in FIG. 3) an authorization to measure. It is thus set into the ONE state and delivers a voltage of level 1 which is applied to the gates $AND_1$ and $AND_2$.

The two gates $AND_1$ and $AND_2$ are connected to the two inputs of a flip-flop circuit $FF_2$. The latter is set to the ONE state when the wave from the transducer-emitter traverses for the first time the zero value. The signal corresponding to this occurrence is transmitted through the second input of the circuit $AND_1$. The flip-flop circuit $FF_2$ remains in its ONE state until it is reset to the ZERO state which is impressed upon it by the circuit $AND_2$ at the moment when the signal of the transducer-receiver first passes the zero value. The same process takes place in the two directions of measurement.

When the flip-flop circuit $FF_2$ is in its ONE state, it opens a gate circuit $AND_3$. The latter receives through its second input the clock pulses having a frequency in the order of 1 MHz, for example. The output of the gate $AND_3$ is connected through a circuit $OR_1$ to the input of the counter $C_1$. The latter has a function analogous to that of counter 5 illustrated in FIG. 1.

The first group of components permits the performance of measurement in the first period, that is, the measurement of period $t_1$ (the upstream transducer 11 then being the transmitter). Thus, the flip-flop circuit $FF_2$, set to the ONE state by the programmer, delivers a voltage which opens the gates $AND_1$ and $AND_2$. The wave emitted by the electric signal generator 2 (FIG. 1) is transformed first by incrementation and then by derivation into a series of positive pulses (FIG. 4) with the elimination of the negative pulses. Such series of positive pulses are generated each time the alternative primary wave passes zero with a positive slope. At the first pulse which follows the authorization for measurement, the flip-flop circuit $FF_1$ is set into the ONE state by the gate $AND_1$. At the appearance of the first succeeding pulse on the receiver, the flip-flop circuit $FF_1$ is reset to the ZERO state. The gate $AND_3$ is thus open during the time $t_1$.

The counter $C_1$ thus counts the clock pulses from the clock 6 received through a circuit $AND_5$ and the gate $OR_1$. The counting is stopped when the flip-flop $FF_2$ is closed. Thus, the duration of counting is $t_1$. The counter 5 indicates a number $N_1$ which, with an accuracy within one clock pulse period, is equal to $t_1$.

The components hereinafter described permit the performance of a measurement in the period $t_2 - t_1$.

The counter $C_1$ is set into its reverse counting position by the flip-flop circuit $FF_3$ upon a command signal from the programmer through the differentiator $D_2$.

The stages of the counter $C_1$ are connected to a circuit $AND_6$ which is connected to the circuit $AND_4$ to open the latter when the counter $C_1$ reaches zero, thus delivering a second authorization to measure to the gate $AND_2$.

The aforenoted second authorization to measure is necessary for stopping the counter $C_1$ at the end of a period which, in reality, corresponds to the phase difference to be measured irrespective of the relative position of the transmitted and received waves.

Figure 4:
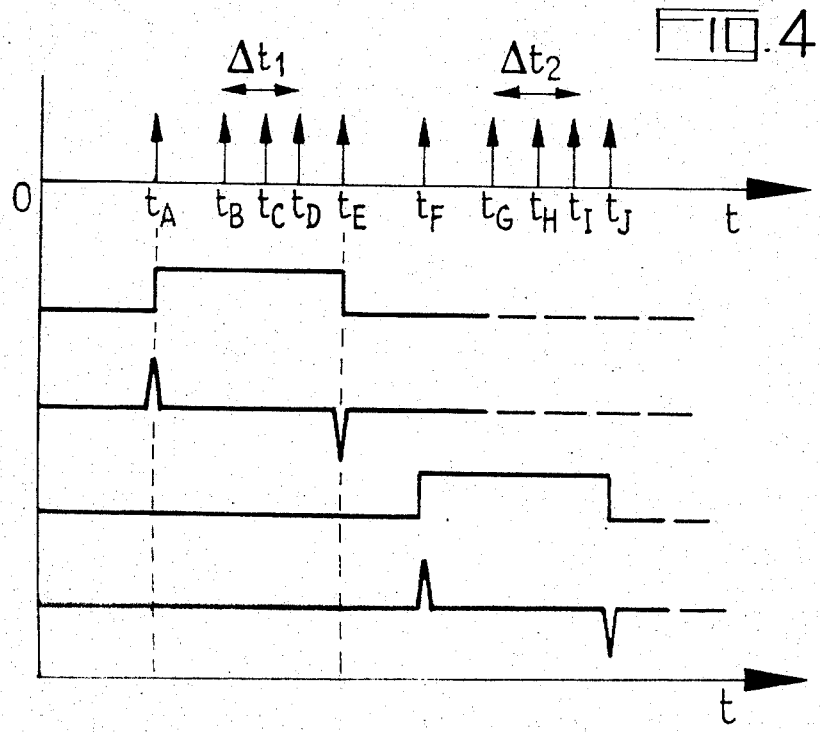
FIG. 4 is an explanatory diagram illustrating measuring periods staggered in time.

The operation of the above-described circuit group will be better understood with reference to the time diagram shown in FIG. 4.

The programmer (not shown) effects the following sequential operations:

a. At the moment $t_A$ there begins a measurement with which $\Delta t_1$ is determined. The flip-flop $FF_1$ causes at a first input the setting of the flip-flop $FF_3$ into its ONE state and thus measuring is effected as it has been seen hereinbefore while the counter $C_1$ is counting.

b. At the moment $t_E$ which indicates the end of the first sequence, a negative pulse is generated by the differentiator $D_1$. The latter causes the flip-flop $FF_3$ to be reset into its ZERO state and sets the counter $C_1$ into a reverse counting position at D.

At the moment $t_F$ the flip-flop $FF_4$ is reset to ZERO state; it thus closes the gate $AND_2$. The reverse counting starts in the manner of the preceding forward counting. The counter, however, can be set to its forward counting position only after it has reached its zero value. At that moment a pulse is generated by the circuit $AND_6$ which sets the flip-flop $FF_4$ to its ONE state. Thereupon the gate $AND_2$ opens, the measuring starts in the sense of forward counting and stops when the receiver receives a wave passing through zero in the increasing sense (positive pulse).

At that moment the counter will have registered a count $\Delta t_2 - \Delta t_1$. It is known that $\Delta t_2$ is necessarily greater than $\Delta t_1$ and that the first phase of reverse counting has erased the entire contents of counter $C_1$, that is, the equivalent of $\Delta t_1$.

All pulse occurrence corresponding to $\Delta t_2 < \Delta t_1$ has to be discarded and must have no effect on the measurement.

When the measuring is terminated, the circuit $AND_4$ and the differentiator $D_1$ generate a negative pulse which resets the flip-flop $FF_3$.

The counter $C_1$ is reset to a reverse counting position.

DESCRIPTION OF THE CIRCUIT USED IN THE THIRD AND FOURTH MEASURING PERIODS

Figure 5:
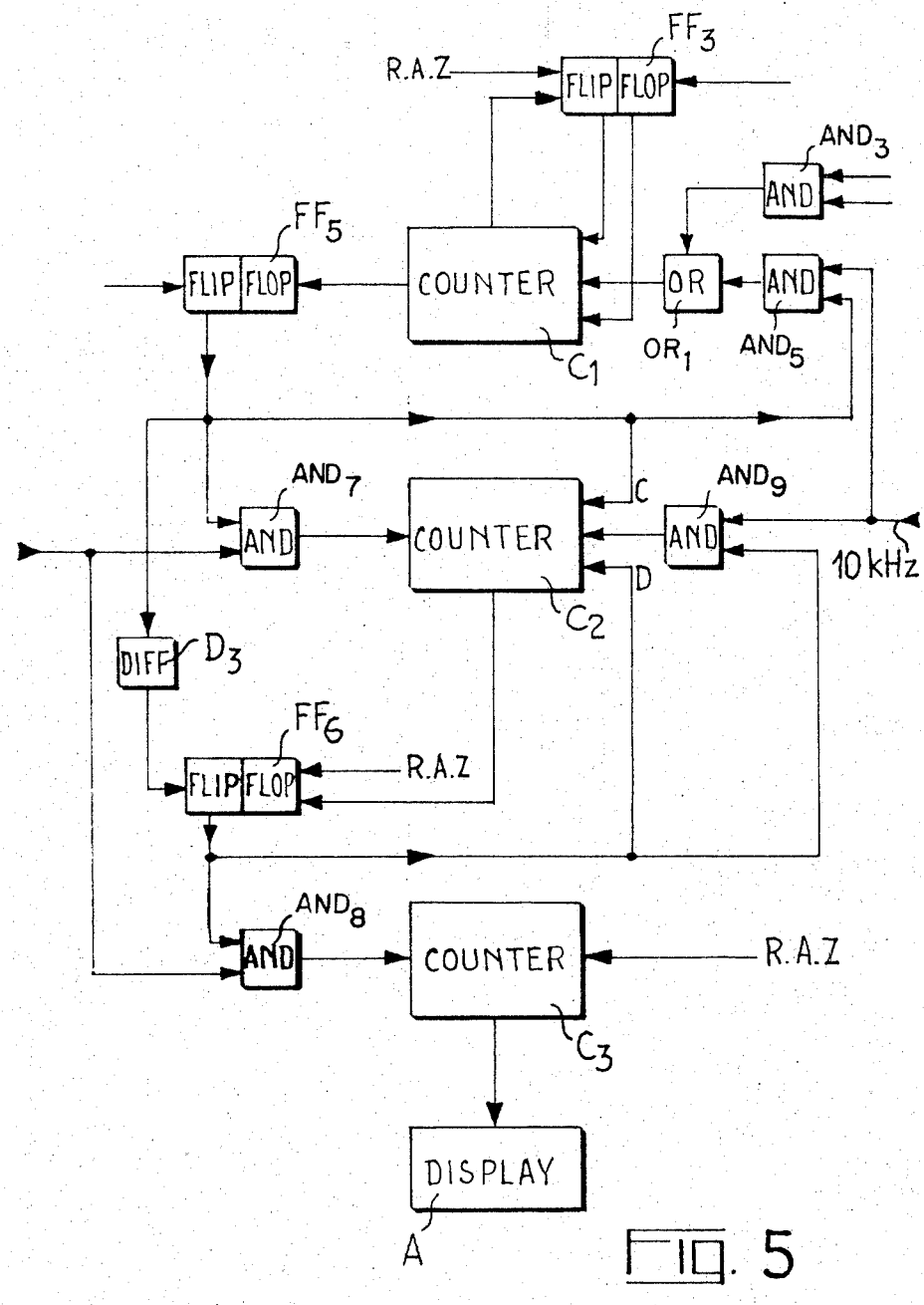
FIG. 5 is a diagram of a second circuit assembly of the preferred embodiment.

FIG. 5 shows the circuit group which is adapted to effect measurements of $(t_2 - t_1)/t_0$ and $(t_2 - t_1)/t_0^2$ In FIG. 5 there are shown components also illustrated in FIG. 3, such as the flip-flop circuit $FF_4$ actuated at one of its inputs by the programmer.

The flip-flop circuit $FF_4$ in its ONE state applies its output voltage to a circuit $AND_5$. The latter, being open, delivers to the counter $C_1$ clock pulses of a frequency much smaller (in the order of 10 KHz) than those referred to earlier.

The counter $C_1$ which is in the position of reverse counting thus receives through the circuit $AND_5$ clock pulses of relatively low frequency. The flip-flop circuit $FF_4$, from the moment of the coupling of the transducers 21 and 22 and as commanded by the programmer, is set to its ONE state. It then authorizes the emptying of counter $C_1$ at the rate of 10 KHz and the forward counting by a counter $C_2$ corresponding to counter 9 in FIG. 1. The flip-flop $FF_4$ is reset to the ZERO state by the counter $C_1$ when the latter reaches zero. Then the pulse delivered by $C_1$ to the second input of the flip-flop $FF_4$ resets it to its ZERO state.

On the other hand, the flip-flop circuit $FF_4$ opens a circuit $AND_7$, the output of which is connected to the counter $C_2$ for making the measurement $(t_2 - t_1)/t_0$. The circuit $AND_7$ receives, on the other hand, recurring coupled pulses of the transducers 21 and 22.

The above-described circuit group operates as follows:

The first recurring pulse sets the flip-flop $FF_4$ into the ONE state and the flip-flop $FF_5$ into the ZERO state.

The gate $AND_5$ is open. The counter $C_1$ starts its reverse counting of the clock pulses supplied at a rate of 10 KHz by the clock. Since the gate $AND_7$ is opened by the flip-flop $FF_4$, the counter $C_2$ counts the recurring pulses delivered by the coupled transducers.

When the counter $C_1$ again reaches zero, the flip-flop $FF_4$ is reset to its ZERO state and the operations are stopped. As the gate $AND_7$ closes, the counter $C_2$ has counted pulses at the frequency $f_0 = 1/t_0$ during a period necessary for the counter $C_1$ to be emptied, that is, during a period proportionate to $t_2 - t_1$. It will thus indicate a counter proportionate to $(t_2 - t_1)/t_0$.

The other components of the circuit permit the performance of the measurement $(t_2 - t_1)/t_0^2$.

The flip-flop circuit $FF_4$ is connected by means of a differentiator $D_3$ to one input of a flip-flop circuit $FF_6$. The other input of the latter is connected to the output of the counter $C_2$ which delivers thereto a pulse when it reaches zero.

The flip-flop circuit $FF_6$ is connected to the input D of the counter $C_2$ and commands its reverse counting. It is also connected to a gate $AND_9$ which, when open, receives low frequency clock pulses. The recurring pulses are forwarded to a counter $C_3$ (which corresponds to the counter 10 in FIG. 1) through a gate $AND_8$ which is open when the flip-flop circuit $FF_6$ is in its ONE state. The output of the counter $C_3$ is connected to a display device A.

The aforedescribed assembly operates in the following manner:

The flip-flop circuit $FF_4$, when it is in its ZERO state, causes the differentiator $D_3$ to generate a negative pulse which sets the flip-flop circuit $FF_6$ into its ONE state. In this latter position, the flip-flop circuit $FF_6$, on the one hand, opens the gate $AND_9$ which permits the feeding of the counter $C_2$ in its reverse counting position. Then the counter $C_2$ is emptied at the rate of the clock pulses. When it reaches zero, it resets the flip-flop circuit $FF_6$ into its ZERO state.

The bistable circuit $FF_6$, on the other hand, also opens in its ONE state the gate $AND_8$, which permits the feeding of the counter $C_3$. Thus, the latter then counts the recurring pulses produced by the transducers; this occurs solely during the period when the flip-flop circuit $FF_6$ is in its ONE state.

The count obtained at the end of the counting process is $(t_2 - t_1)/t_0^2$ for the same reasoning as applied to the counter $C_2$.

The display device A then indicates the speed $v$ of the fluid in the conduit 1.

That which is claimed is:

1. In an ultrasonic flowmeter for measuring the speed of a fluid flowing in a conduit, said flowmeter being of the known type that has (a) two first electroacoustic transducers disposed on the wall of said conduit at opposite sides of the same diametral plane and spaced in the direction of fluid flow, both said first transducers emitting ultrasonic signals and receiving ultrasonic signals emitted by the other after they traverse said conduit at a predetermined inclined angle with respect to the direction of fluid flow, each first transducer having an electric output on which an electric signal appears upon receipt of an ultrasonic signal from the other first transducer, (b) means for alternately and oppositely switching said first transducers to reception and transmission, (c) means for measuring $t_2 - t_1$, wherein $t_2$ is the traveling time of the ultrasonic signals from the downstream transducer to the upstream transducer and $t_1$ is the traveling time of the ultrasonic signals from the upstream transducer to the downstream transducer, (d) two second electroacoustic transducers disposed on the wall of said conduit at diametrically opposed locations, one of said second transducers emitting ultrasonic signals and the other of said second transducers receiving the same, (e) means for coupling said second transducers to one another to cause the appearance at an output of the receiving second transducer a train of electric pulses with a periodicity of $t_0$, wherein $t_0$ is close to $t_1$ and $t_2$ and is the traveling time of the ultrasonic signals from one of said second transducers to the other, (f) means for measuring $t_0$ and (g) means for determining the term $(t_2 - t_1)/t_0^2$ representing the speed of said fluid in said conduit, the improvement comprising, A. a clock transmitting electric clock pulses,
B. a first counter connected to said clock and to said output of each first transducer,
C. means connected to said first counter for causing the latter to start counting forward with the rate of said clock pulses at the moment said upstream transducer emits an ultrasonic signal,
D. means connected to said first counter to stop its forward counting upon receipt of said last-named ultrasonic signal by said downstream transducer,
E. means connected to said first counter for causing the latter to start counting in reverse at the moment said downstream transducer emits an ultrasonic signal,
F. means connected to said first counter to cause the latter to start counting forward at the moment it reaches zero during its reverse counting,
G. means connected to said first counter to stop its forward counting upon receipt of the last-named ultrasonic signal by said upstream transducer to contain a count of $t_2 - t_1$,
H. a second counter,
I. means operatively connecting said second counter with said first counter and with said output of said receiving second transducer to count pulses of $t_0$ periodicity during a reverse counting of said first counter as long as the latter has contents other than zero, at which moment said second counter contains a count proportionate to $(t_2 - t_1)/t_0$,
J. a third counter,
K. means operatively connecting said third counter with said second counter and with said output of said receiving second transducer to count pulses of $t_0$ periodicity during a reverse counting of said second counter as long as the latter has contents other than zero, at which moment said third counter contains a count proportionate to $(t_2 - t_1)/t_0^2$.

2. A method of measuring the speed of a fluid in a conduit, comprising the following steps:

A. transmitting an ultrasonic signal across said conduit in the downstream direction at an inclined angle to the direction of fluid flow,
B. counting clock pulses during the traveling time $t_1$ of the ultrasonic signal transmitted according to step (A) to determine $t_1$, said steps (A) and (B) constituting a first measuring period,
C. transmitting an ultrasonic signal across said conduit in the upstream direction at said angle,
D. counting clock pulses during the traveling time $t_2$ of the ultrasonic signal transmitted according to step (C) to determine $t_2$ and the difference $t_2 - t_1$, said steps (C) and (D) constituting a second measuring period,
E. transmitting ultrasonic signals diametrically across said conduit with a periodicity of $t_0$ which is the traveling time of the last-named ultrasonic signals diametrically across said conduit,
F. generating a train of electric pulses with a periodicity of $t_0$ in response to the ultrasonic signals transmitted according to step (E),
G. counting the electric pulses generated according to step (F) for a period proportionate to $t_2 - t_1$ to determine a term proportionate to $(t_2 - t_1)/t_0$, said step (G) constituting a third measuring period and
H. counting the electric pulses generated according to step (F) for a period proportionate to $(t_2 - t_1)/t_0$ to determine the term $(t_2 - t_1)/t_0^2$ representing the speed of the fluid in said conduit, said step (H) constituting a fourth measuring period.

3. A method as defined in claim 2, wherein the counting steps (B) and (D) are performed by a first counter at a relatively high clock pulse frequency, the counting step (G) is performed by a second counter during an emptying of the contents $t_2 - t_1$ of the first counter at the rate of a relatively low clock pulse frequency and the counting step (H) is performed by a third counter during an emptying of the contents $(t_2 - t_1)/t_0$ of the second counter at the rate of said relatively low clock pulse frequency.

* * * * *